United States Patent
Rendall

(10) Patent No.: US 12,040,452 B2
(45) Date of Patent: Jul. 16, 2024

(54) STACK FOR AN ENERGY STORAGE DEVICE

(71) Applicant: Dyson Technology Limited, Wiltshire (GB)

(72) Inventor: Michael Edward Rendall, Newbury (GB)

(73) Assignee: Dyson Technology Limited, Wiltshire (GB)

(*) Notice: Subject to any disclaimer, the term of this patent is extended or adjusted under 35 U.S.C. 154(b) by 822 days.

(21) Appl. No.: 17/261,516

(22) PCT Filed: Jul. 19, 2019

(86) PCT No.: PCT/GB2019/052040
§ 371 (c)(1),
(2) Date: Jan. 19, 2021

(87) PCT Pub. No.: WO2020/016609
PCT Pub. Date: Jan. 23, 2020

(65) Prior Publication Data
US 2021/0265666 A1  Aug. 26, 2021

(30) Foreign Application Priority Data
Jul. 20, 2018 (GB) .................................... 1811879

(51) Int. Cl.
*H01M 10/0585* (2010.01)
*H01J 49/00* (2006.01)
(Continued)

(52) U.S. Cl.
CPC ..... *H01M 10/0585* (2013.01); *H01J 49/0004* (2013.01); *H01J 49/04* (2013.01); *H01J 49/105* (2013.01); *H01J 49/164* (2013.01)

(58) Field of Classification Search
CPC .. H01M 10/0585; H01J 49/0004; H01J 49/04; H01J 49/105; H01J 49/164; H01J 49/004
See application file for complete search history.

(56) References Cited

U.S. PATENT DOCUMENTS 6,611,576 B1   8/2003   Besser et al.
7,666,490 B1   2/2010   Iseki et al.
(Continued)

FOREIGN PATENT DOCUMENTS

GB   2493020 A     1/2013
JP   2003-17039 A  1/2003
(Continued)

OTHER PUBLICATIONS

Office Action received for Chinese Patent Application No. 201980048210.9, mailed on Sep. 28, 2023, 18 pages (10 pages of English Translation and 8 pages of Original Document).
(Continued)

*Primary Examiner* — David E Smith
(74) *Attorney, Agent, or Firm* — Tucker Ellis LLP

(57) ABSTRACT

A method comprises obtaining a stack for an energy storage device, the stack comprising one or more layers: laser ablating the stack so as to form a cut through one or more of the layers, thereby producing one or more laser ablation products: and analysing, using a mass spectrometry-based analysis technique, the laser ablation products thereby to determine one or more characteristics of the stack. Also disclosed is an apparatus.

14 Claims, 8 Drawing Sheets

(51) Int. Cl.
*H01J 49/04* (2006.01)
*H01J 49/10* (2006.01)
*H01J 49/16* (2006.01)

(56) References Cited

U.S. PATENT DOCUMENTS

| | | | |
|---|---|---|---|
| 7,946,247 B2 | 5/2011 | Awata et al. | |
| 8,148,012 B2 | 4/2012 | Takezawa et al. | |
| 8,192,864 B2 | 6/2012 | Takezawa et al. | |
| 8,554,353 B2 | 10/2013 | Jeong et al. | |
| 8,974,550 B2 | 3/2015 | Onoda et al. | |
| 9,061,369 B2* | 6/2015 | Yoo | B23K 26/38 |
| 9,157,802 B2 | 10/2015 | Jeong et al. | |
| 9,287,437 B2 | 3/2016 | Wu et al. | |
| 9,383,260 B1 | 7/2016 | Yoo et al. | |
| 2005/0061779 A1 | 3/2005 | Blumenfeld et al. | |
| 2008/0187834 A1 | 8/2008 | Takezawa et al. | |
| 2008/0187835 A1 | 8/2008 | Takezawa et al. | |
| 2008/0268343 A1 | 10/2008 | Sato et al. | |
| 2009/0191327 A1 | 7/2009 | Lotz et al. | |
| 2011/0300290 A1 | 12/2011 | Kim et al. | |
| 2011/0300665 A1 | 12/2011 | Harley et al. | |
| 2013/0153552 A1 | 6/2013 | Jeong et al. | |
| 2013/0168545 A1* | 7/2013 | Clem | H01J 49/0463 250/288 |
| 2014/0007809 A1 | 1/2014 | Stolt et al. | |
| 2014/0287953 A1* | 9/2014 | Gunther | G01N 33/60 506/9 |
| 2014/0326043 A1 | 11/2014 | Wegner et al. | |
| 2015/0190884 A1 | 7/2015 | Roy et al. | |
| 2015/0255667 A1 | 9/2015 | Britt et al. | |
| 2015/0357173 A1 | 12/2015 | Koeppen et al. | |
| 2016/0005578 A1 | 1/2016 | Koeppen et al. | |
| 2017/0271714 A1 | 9/2017 | Iwasaki et al. | |

FOREIGN PATENT DOCUMENTS

| | | | |
|---|---|---|---|
| JP | 2004-63419 A | 2/2004 | |
| JP | 2004063419 A * | 2/2004 | |
| JP | 2007-103468 A | 4/2007 | |
| JP | 2014-146752 A | 8/2014 | |
| JP | 2015-69868 A | 4/2015 | |
| KR | 10-2012-0038359 A | 4/2012 | |
| WO | 2012/072120 A1 | 6/2012 | |
| WO | 2015/185129 A1 | 12/2015 | |
| WO | WO-2015185129 A1 * | 12/2015 | C01G 35/006 |

OTHER PUBLICATIONS

Examination Report dated Mar. 5, 2021, directed to GB Application No. 1811879.4; 4 pages.
International Search Report and Written Opinion mailed Oct. 17, 2019, directed to International Application No. PCT/GB2019/052040; 15 pages.
Search Report dated Oct. 5, 2018, directed to GB Application No. 1811879.4; 2 pages.
Office Action received for Japanese Patent Application No. 2021-502962, mailed on Jan. 18, 2022, 3 pages (1 pages of English Translation and 2 pages of Original Document).

* cited by examiner

STACK FOR AN ENERGY STORAGE DEVICE

REFERENCE TO RELATED APPLICATIONS

This application is a national stage application under 35 U.S.C. 371 of International Application No. PCT/GB2019/052040, filed Jul. 19, 2019, which claims the priority of United Kingdom Application No. 1811879.4, filed Jul. 20, 2018, the entire contents of each of which are incorporated herein by reference.

FIELD OF THE DISCLOSURE

The present disclosure relates to a stack for an energy storage device, and, more specifically, although not exclusively, to methods and apparatus for processing a stack for an energy storage device.

BACKGROUND OF THE DISCLOSURE

A known method of producing energy storage devices such as solid-state thin film cells comprising layers of electrodes, electrolyte and current collectors is to first form a stack comprising a first current collecting layer formed on a substrate, an electrode layer, an electrolyte layer, a second electrode layer and a second current collecting layer. The stack is then cut into separate sections to form individual cells. Each cell can then be coated with a protective layer, for example, in order to prevent passivation of the layers and possible shorts.

In order to form an electrical connection with the cell, for example in order to electrically connect current collectors of multiple cells stacked one on top of another, part of the protective layer may be removed, for example by etching. Alternatively, a mask can be applied prior to the coating process to ensure that a portion of each current collector is left exposed.

However, known formation and processing of stacks for energy storage devices such as solid-state thin film cells can be inefficient and/or of limited reliability, making effective commercialisation difficult. It is therefore desirable to provide efficient and/or reliable methods for forming and processing of a stack for an energy storage device.

SUMMARY OF THE DISCLOSURE

According to some embodiments of the present disclosure, there is provided a method comprising: obtaining a stack for an energy storage device, the stack comprising one or more layers; laser ablating the stack so as to form a cut at least part way through one or more of the layers, thereby producing one or more laser ablation products; analysing, using a mass spectrometry based analysis technique, the laser ablation products thereby to determine one or more characteristics of the stack. In some embodiments, laser ablating the stack is so as to form a cut through (i.e. the entire way through) one or more of the layers.

Analysing the laser ablation products using a mass-spectrometry based technique may allow for fast and efficient determination of the one or more characteristics of the stack. These characteristics may be used, for example, to inform upstream production and/or downstream processing of the stack, which may, in turn, allow for the efficient and/or reliable production of an energy storage device therefrom. The fast (e.g. real-time or near real-time) determination of the one or more characteristics of the stack may allow the production and/or processing of the stack to be performed at speed, for example in a reel-to-reel type production process, which may be efficient.

In some embodiments, the method comprises correlating a position of the laser ablating with the determined one or more characteristics. This may allow for position dependant characteristics of the stack to be determined. For example, the characteristic may comprise quality control information. Correlating this characteristic with a position of the laser ablating that produced the laser ablation products on the basis of which the characteristic is determined may provide, for example, for a determination of specific regions of the stack which do comply with quality control standards. This may provide improved granularity or specificity of information that may be used to inform upstream production and/or downstream processing of the stack, and hence may, in turn, allow for the efficient and/or reliable production of an energy storage device therefrom.

In some embodiments, the position comprises at least one location in the plane of the stack. The position comprising at least one location in the plane of the stack may allow for example for the determined characteristics to be relatable to specific regions along the length or width of the stack. This may provide improved granularity or specificity of information informing upstream production and/or downstream processing of the stack, and hence may, in turn, allow for the efficient and/or reliable production of an energy storage device therefrom.

In some embodiments, the method comprises moving, concurrently with or intermittently of the laser ablating, the stack in a first direction, and the position comprises a location along an axis parallel to the first direction. This may allow, for example, the determined characteristics to be relatable to positions along the length of the stack, for example where the stack is moved or processed in a reel-to-reel arrangement. This information may be used, for example, to inform upstream production and/or downstream processing of the stack, and hence may, in turn, allow for the efficient and/or reliable production of an energy storage device therefrom.

In some embodiments, the method comprises moving, concurrently with or intermittently of the laser ablating, the stack in a first direction, and the position comprises a location along an axis perpendicular to the first direction. This may allow, for example, the determined characteristics to be relatable to positions across the width of the stack, for example where the stack is moved or processed in a reel-to-reel arrangement. This information may be used, for example, to inform upstream production and/or downstream processing of the stack, and hence may, in turn, allow for the efficient and/or reliable production of an energy storage device therefrom.

In some embodiments, the position comprises a depth into stack. In some embodiments, this may be used, for example, may be used to determine whether each layer of the stack is of the correct or expected thickness. This information may be used to adjust the stack production process accordingly, and hence for example allow for improved stack production. In some embodiments, the depth of the laser ablation correlated with the determined characteristic of the stack may be used to determine a composition in different layers of the stack. This may be used, for example, to inform upstream production and/or downstream processing of the stack, and hence may, in turn, allow for the efficient and/or reliable production of an energy storage device therefrom.

In some embodiments, the method comprises storing, in a storage medium, data representing the correlated position and data representing the determined one or more characteristics in association with one another. This may allow, for example, for the data to be efficiently used to inform further processing of the stack, for example folding of the stack and/or segmentation of the stack into cells.

In some embodiments, the method comprises determining a parameter, based on the correlated position and determined one or more characteristics, for processing the laser ablated stack. This may allow the further processing of the stack, for example folding or segmentation of the stack, to be performed on the basis of a simple parameter, which may reduce the processing of data required at components arranged to perform the further processing of the stack, which may provide for more efficient and/or reliable further processing of the stack.

In some embodiments, the parameter comprises a number of energy storage device cells formed from the laser ablated stack that are to be included in a given energy storage device. For example, it may be determined, based on the correlated position and determined one or more characteristics, that a given portion of the stack will produce a number cells that are ineffective, and hence that more cells are to be included in the energy storage device including the given portion of stack, so as to compensate for the ineffective cells. This may allow for the further processing of the stack, for example folding of the stack and/or segmentation of the stack into cells, to compensate for certain characteristics of the stack. This may allow for reliable energy storage device production. This may also reduce or obviate the need to perform quality control procedures on the energy storage device produced from the stack, which may allow for efficient energy storage device production.

In some embodiments, the method comprises processing the laser ablated stack based on the correlated position and determined one or more characteristics and/or based on the determined parameter. As mentioned, this may allow for efficient and/or reliable processing of the stack, and hence for reliable and/or efficient energy storage device production.

In some embodiments, the method comprises: moving the stack relative to a laser beam used for the laser ablating; laser ablating the stack so as to form a further cut through one or more of the layers, thereby producing one or more further laser ablation products; analysing, using the mass spectrometry based analysis technique, the further laser ablation products thereby to determine one or more further characteristics of the stack; and correlating a position of the further laser ablating with the determined one or more further characteristics. This may allow for repeated, for example continuous or near continuous, characterisation of the stack, for example in reel-to-reel type processing of the stack. Moving the stack, for example in a reel-to-reel type processing, may provide for efficient processing of the stack, and hence for efficient energy storage device production.

In some embodiments, the method comprises using the determined one or more characteristics, or the correlated position and determined one or more characteristics, to adjust a production of the obtained stack. This may allow for improved control of the production of the stack, which may provide for reliable and/or efficient stack production and hence, in turn, reliable and/or efficient energy storage device production.

In some embodiments, the determined one or more characteristics comprise one or more of: an identity of one or more of the laser ablation products, an identity of one or more components of one or more of the layers of the stack, and a quality control parameter for the stack. For example, identity of one or more components of one or more of the layers of the stack may be derived from the identity of one or more of the laser ablation products. Determining the identity of one or more of the laser ablation products or components of the layers of the stack may allow, for example, improved control of the laser ablation. For example, if the identity of the laser ablation product or component of the stack indicates that the laser ablation is of a layer of the stack that is not expected or intended, the laser ablation may be adjusted accordingly. Determining the identity of one or more of the laser ablation products or components of the stack may allow, for example, determination of whether the components of the stack, or the proportions of components of the stack, are expected, and/or the presence of impurities in the stack, which may be used to inform and/or adjust the production of the stack. The quality control parameter may be, for example, a parameter indicating whether, or the extent to which, the stack or layers thereof meet quality control standards, for example relating to expected or desired thickness, components, proportion of components, and/or impurities of the stack or layers of the stack.

In some embodiments, the mass spectrometry based technique comprises Inductively Coupled Plasma Mass Spectrometry, ICP-MS. This may provide for a particularly rapid analysis of the laser ablation products, and hence may allow for a more immediate determination of the one or more characteristics, which help may improve the immediacy with which information may be provided to the upstream production and/or downstream processing of the stack. This may allow for faster production and/or processing of the stack, which may improve efficiency.

According to some embodiments of the present disclosure, there is provided apparatus for determining one or more characteristics of a stack for an energy storage device, the stack comprising one or more layers, the apparatus comprising: a laser system arranged to laser ablate the stack in use so as to form a cut at least part way through one or more of the layers, thereby producing one or more laser ablation products in use; an analyser arranged to analyse the laser ablation products produced in use thereby to determine one or more characteristics of the stack; and a correlator arranged to correlate a position of the laser ablation with the determined one or more characteristics; wherein the position comprises at least one location in the plane of the stack ablated by the laser system in use. In some embodiments, the position comprises at least one location in a plane substantially perpendicular to an axis defined by a laser beam, produced by the laser system, that laser ablates the stack in use. In some embodiments, the laser system is arranged to laser ablate the stack in use so as to form a cut through (i.e. the entire way through) one or more of the layers.

Correlating the determined characteristic with a position of the laser ablation that produces the laser ablation products on the basis of which the characteristic is determined may provide, for example, for a determination of specific regions of the stack which do comply with quality control standards. This may provide improved granularity or specificity of information that may be used to inform upstream production and/or downstream processing of the stack, and hence may, in turn, allow for the efficient and/or reliable production of an energy storage device therefrom. The position comprising at least one location in the plane of the stack may allow for example for the determined characteristics to be relatable to specific regions along the length or width of the stack. This may provide improved granularity or specificity of information informing upstream production and/or downstream processing of the stack, and hence may, in turn, allow for the efficient and/or reliable production of an energy storage device therefrom.

In some embodiments, the analyser is arranged to analyse, using a mass-spectrometry based technique, the laser products produced in use thereby to determine the one or come characteristics of the stack. Analysing the laser ablation products using a mass-spectrometry based technique may allow for fast and efficient determination of the one or more characteristics of the stack. The fast (e.g. real-time or near real-time) determination of the one or more characteristics of the stack may allow the production and/or processing of the stack to be performed at speed, for example in a reel-to-reel type production process, which may be efficient.

In some embodiments, in use, concurrently with or intermittently of the laser ablation, the stack moves in a direction of travel, and the correlator is arranged to correlate the position of the laser ablation with the determined one or more characteristics based on a speed at which the stack is moved. Determining the location based on the speed of travel of the stack may provide for cost-effective and efficient correlation of the characteristic with the location in a direction parallel to the direction of travel of the stack, for example without the need for means to directly measure the travel of the stack.

Further features and advantages of the disclosure will become apparent from the following description of preferred embodiments of the disclosure, given by way of example only, which is made with reference to the accompanying drawings.

DETAILED DESCRIPTION OF THE DISCLOSURE

Details of methods, structures and devices according to some embodiments will become apparent from the following description, with reference to the Figures. In this description, for the purpose of explanation, numerous specific details of certain examples are set forth. Reference in the specification to "an example," "an embodiment." or similar language means that a particular feature, structure, or characteristic described in connection with the example/embodiment is included in at least that one example/embodiment, but not necessarily in other examples/embodiments. It should further be noted that certain examples/embodiments are described schematically with certain features omitted and/or necessarily simplified for ease of explanation and understanding of the concepts underlying the examples/embodiments.

Figure 1:
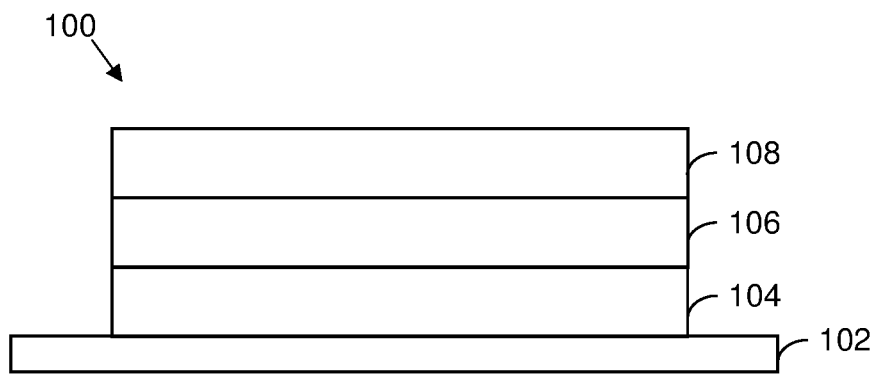
FIG. 1 is a schematic diagram that illustrates a stack for an energy storage device according to embodiments.

FIG. 1 shows a stack 100 of layers for an energy storage device. The stack 100 of FIG. 1 may be used as part of a thin film energy storage device having a solid electrolyte, for example. In these cases, the stack 100 may be referred to as an energy storage device stack 100.

The stack 100 comprises a substrate 102, a cathode layer 104, an electrolyte layer 106 and an anode layer 108. In the example of FIG. 1, the anode layer 108 is further from the substrate 102 than the cathode layer 104, and the electrolyte layer 106 is between the cathode layer 104 and the anode layer 108. The substrate 102 contacts the cathode layer 104 and supports the stack. While in this example the substrate 102 contacts the cathode layer 104, in other examples there may be additional layers (not shown) in between the substrate 102 and the cathode layer 104.

In some embodiments, the substrate 102 may be or comprise nickel foil; but it will be appreciated that any suitable metal could be used, such as aluminium, copper or steel, or a metallised material including metallised plastics such as aluminium on polyethylene terephthalate (PET).

The cathode layer 104 may act as a positive current collecting layer. The cathode layer 104 may form a positive electrode layer (i.e. that corresponds to a cathode during discharge of a cell of an energy storage device including the stack 100). The cathode layer 104 may comprise a material which is suitable for storing Lithium ions by virtue of stable chemical reactions, such as Lithium Cobalt Oxide, Lithium Iron Phosphate or alkali metal polysulphide salts.

The anode layer 108 may act as a negative current collecting layer. The anode layer 108 may form a negative electrode layer (i.e. that corresponds to an anode during discharge of a cell of the energy storage device including the stack 100). The anode layer 108 may comprise a Lithium metal, Graphite, Silicon or Indium Tin Oxides.

In some embodiments, the anode layer 108 may comprise a negative current collector and a separate negative electrode layer (not shown). In these embodiments, the negative electrode layer may comprise a Lithium metal, Graphite, Silicon or Indium Tin Oxides, and/or the negative current collector may comprise nickel foil. However, it will be appreciated that any suitable metal could be used, such as aluminium, copper or steel, or a metallised material including metallised plastics such as aluminium on polyethylene terephthalate (PET).

The electrolyte layer 106 may include any suitable material which is ionically conductive, but which is also an electrical insulator such as lithium phosphorous oxynitride (LiPON). The electrolyte layer 106 may be a solid layer, and may be referred to as a fast ion conductor. A solid electrolyte layer may have structure which is intermediate between that of a liquid electrolyte, which for example lacks a regular structure and includes ions which may move freely, and that of a crystalline solid. A crystalline material for example has a regular structure, with an ordered arrangement of atoms, which may be arranged as a two-dimensional or three-dimensional lattice. Ions of a crystalline material are typically immobile and may therefore be unable to move freely throughout the material.

The stack 100 may for example be manufactured by depositing the cathode layer 104 on the substrate 102. The electrolyte layer 106 is subsequently deposited on the cathode layer 104, and the anode layer 108 is then deposited on the electrolyte layer 106. Each layer of the stack 100 may be deposited by flood deposition, which provides a simple and effective way of producing a highly homogenous layer, although other deposition methods are possible.

The stack 100 of FIG. 1 may undergo processing to manufacture an energy storage device.

Figure 2:
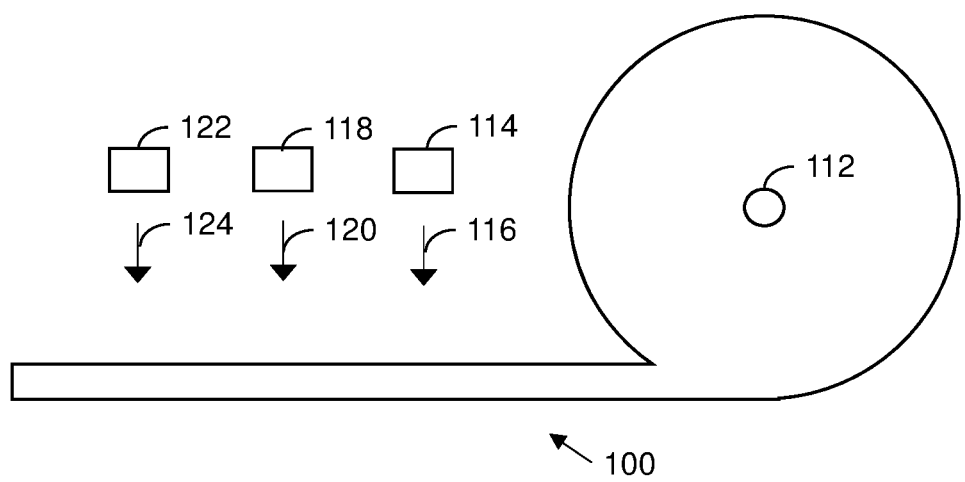
FIG. 2 is a schematic diagram that illustrates one way of processing the stack of FIG. 1 for the manufacture of an energy storage device according to some embodiments.

A general overview of an example of processing that may be applied to the stack 100 of FIG. 1 is illustrated schematically in FIG. 2.

In FIG. 2, the stack 100 is processed for the manufacture of an energy storage device. The stack 100 in this example is flexible, allowing it to be wound around a roller 112, for example, as part of a roll-to-roll manufacturing process (sometimes referred to as a reel-to-reel manufacturing process). The stack 100 may be gradually unwound from the roller 112 and subjected to processing.

In the example of FIG. 2, grooves may be formed in the stack 100 using a first laser 114. The first laser 114 is arranged to apply laser beams 116 to the stack 100 to remove portions of the stack 100 by laser ablation, thereby forming the grooves.

After formation of the grooves, electrically insulating material may be introduced into at least some of the grooves using an insulating material system 118. An electrically insulating material may be considered to be electrically non-conductive and may therefore conduct a relatively a small amount of electric current when subjected to an electric field. Typically, electrically insulating material (sometimes referred to as an insulator) conducts less electric current than semiconducting materials or electrically conductive materials. However, a small amount of electric current may nevertheless flow through an electrically insulating material under the influence of an electric field, as even an insulator may include a small amount of charge carriers for carrying electric current. In some embodiments herein, a material may be considered to be electrically insulating where it is sufficiently electrically insulating to perform the function of an insulator. This function may be performed for example where the material insulates one element from another sufficiently for short-circuits to be avoided.

Referring to FIG. 2, after introduction of the electrically insulating material, the stack 110 is cut to form separate cells for an energy storage device. In some embodiments, hundreds and potentially thousands of cells can be cut from a roll of the stack 100, allowing multiple cells to be manufactured in an efficient manner.

In FIG. 2, the cutting operation is performed using a second laser 122, which is arranged to apply laser beams 124 to the stack 100. Each cut may for example be through the centre of an insulating plug such that the plug is split into two pieces, each piece forming a protective covering over exposed surfaces including edges, to which it has attached.

Although not shown in FIG. 2 (which is merely schematic), it is to be appreciated that, after introduction of the insulating material (or otherwise), the stack may be folded back on itself to create a z-fold arrangement having for example tens, possibly hundreds, and potentially thousands, of layers with each of the insulating plugs aligned. The laser cutting process performed by the second laser 122 may then be used to cut through the z-fold arrangement in a single cutting operation for each of the aligned sets of plugs.

After cutting the cells, electrical connectors can be provided along opposite sides of a cell, such that a first electrical connector on one side of the cell contacts the cathode layer(s) 104, but is prevented from contacting the other layers by the electrically insulating material. Similarly, a second electrical connector on an opposite side of the cell can be arranged in contact with the anode layer(s) 108, but is prevented from contacting the other layers by the insulating material. The insulating material may therefore reduce the risk of a short-circuit between the anode and cathode layers 104, 108, and the other layers in each cell. The first and second electrical connectors may, for example, comprise a metallic material that is applied to the edges of the stack (or to the edges of the intermediate structure 110) by sputtering. The cells can therefore be joined in parallel in an efficient manner.

The foregoing description provides a general overview of an example of a stack 100 for an energy storage device, as well as an example of processing that may be applied to the stack 100, for example for the production of an energy storage device. The following description provides example methods and apparatuses for analysing and processing a stack 200 (which may be the same as or similar to the stack 100 described with reference to FIG. 1), which may provide for improvements in efficiency and/or reliability in the processing of the stack 200 and, hence, for the efficient production of an energy storage device such as a cell produced therefrom.

Figure 3:
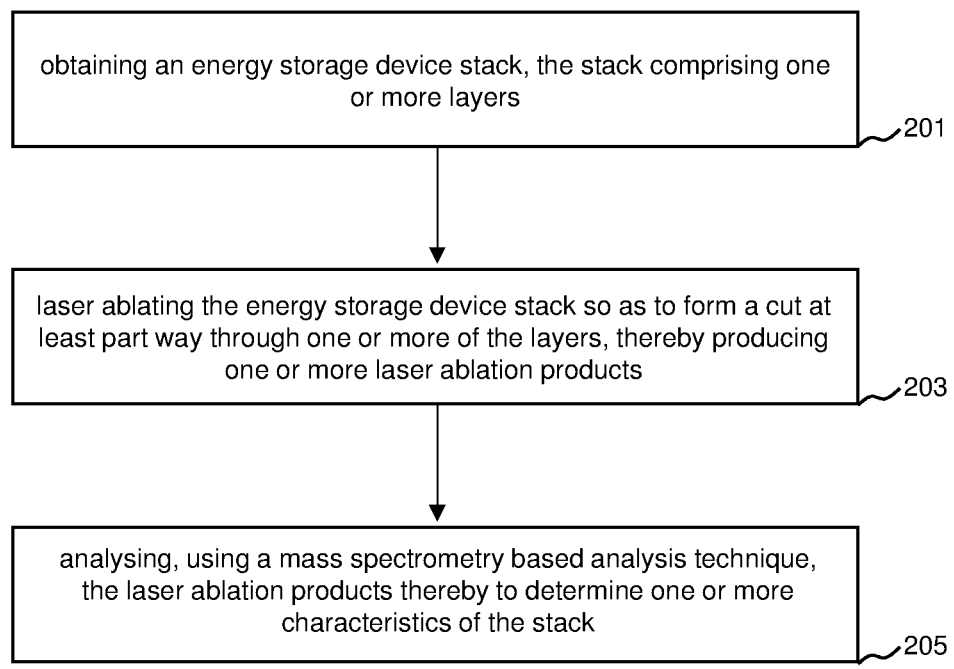
FIG. 3 is a flow diagram that illustrates a method of analysing a stack according to an example.

Referring to FIG. 3, there is illustrated schematically a method of analysing an energy storage device stack 200, according to an example.

In broad overview the method comprises, in step 201, obtaining a stack 200 for an energy storage device, the stack 200 comprising one or more layers. The method further comprises, in step 203, laser ablating the stack 200 so as to form a cut at least part way through one or more of the layers, thereby producing one or more laser ablation products. The method further comprises, in step 205, analysing, using a mass spectrometry based analysis technique, the laser ablation products thereby to determine one or more characteristics of the stack 200.

As explained in more detail hereafter, the method may allow for fast and efficient determination of characteristics of the stack. These characteristics may be used, for example, to inform upstream production and/or downstream processing of the stack, which may, in turn, allow for the efficient and/or reliable production of an energy storage device therefrom.

Figure 4:
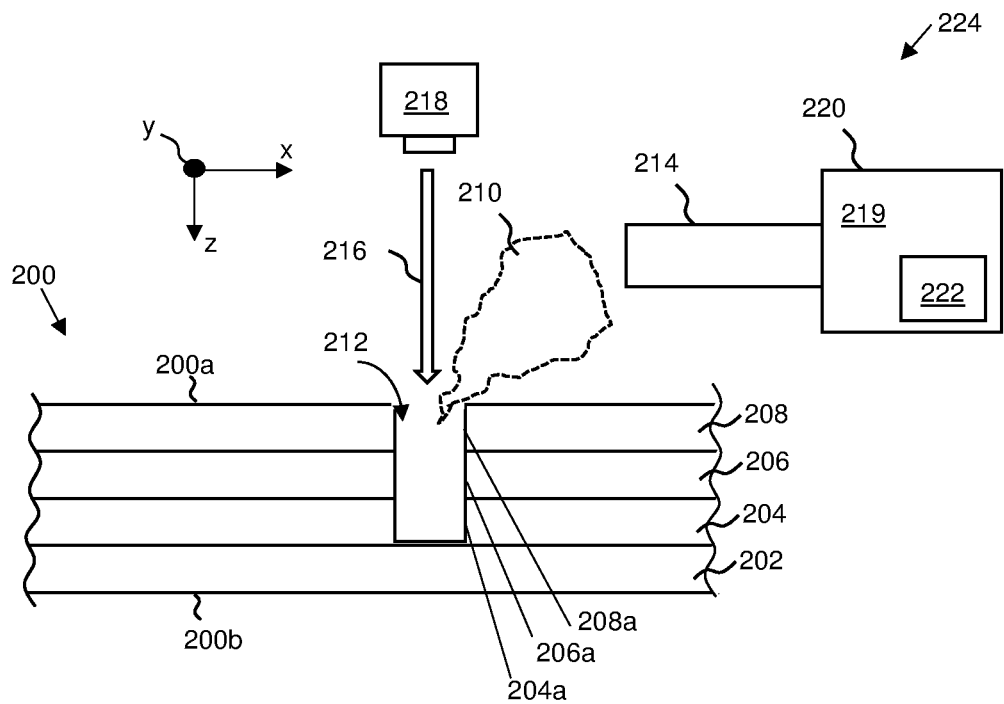
FIG. 4 is a schematic diagram that illustrates one way of analysing a stack according to a first example.

Referring now to FIG. 4, there is illustrated schematically an energy storage device stack 200 (i.e. that may be obtained in accordance with examples of step 201 of the method described with reference to FIG. 3). The stack 200 is shown being subjected to laser energy from a laser beam 216 to cause laser ablation, which in turn forms a cut 212 and produces laser ablation products 210 (in accordance with examples of step 203 of the method described with reference to FIG. 3). The laser ablation products 210 are being analysed (by a mass spectrometer 219) to determine one or more characteristics of the stack 200 (in accordance with examples of step 205 of the method described with reference to FIG. 3).

It should be noted that the laser ablation products 210 may be regarded under some circumstances as "by-products", in that the stack 200 having the cut 212 formed therein may be the main or desired "product" of the laser ablation whereas the removed or ejected laser ablation products 210 may be considered as secondary or by-products. However, it is to be understood that, as used herein, the term "laser ablation products 210" are those products of laser ablation which are ejected or otherwise removed from the stack 200.

The stack 200 may be the same as or similar to that described with reference to FIG. 1. In the example illustrated in FIG. 4, the energy storage device stack 200 comprises a substrate layer 202, a cathode layer 204, and electrolyte layer 206, and an anode layer 208. These may be the same as or similar to the layers of the stack 100 described with reference to FIG. 1. For example, the cathode layer 204 may comprise a cathode electrode and a cathode current collector (not shown in FIG. 4) and the anode layer 208 may comprise an anode electrode and an anode current collector (not shown in FIG. 3). In the example illustrated in FIG. 4, the electrolyte layer 206 is between the cathode layer 204 and the anode layer 208, the cathode layer 204 is adjacent to the substrate layer 202, the electrolyte layer 206 is adjacent to the cathode layer 204, and the anode layer 208 is adjacent to the electrolyte layer 206.

As illustrated in FIG. 4, an apparatus 224 comprises a laser system 218 and an analyser 220. A laser beam 216, produced by the laser system 218, is directed at the stack 200 to apply laser ablation to the stack 200. As used herein, "laser ablation" may refer to the removal of material from the stack 200 using a laser-based process. This removal of material may comprise any one or more of multiple physical processes. For example the removal of material may comprise (without limitation) any one or combination of melting, melt-expulsion, vaporisation (or sublimation), photonic decomposition (single photon), photonic decomposition (multi-photon), mechanical shock, thermo-mechanical shock, other shock-based processes, surface plasma machining, and removal by evaporation (ablation).

The laser ablation forms a cut 212 through one or more layers of the stack 202-208. In the example illustrated in FIG. 4, the laser ablation forms a cut 212 through each of the anode layer 208, the electrolyte layer 206, and the cathode layer 204, but not through the substrate layer 202. In the example of FIG. 4, the cut in the form of a groove 212. As used herein, the term "groove" may refer to a channel, slot or trench that may be continuous or non-continuous, and may in some examples be elongate, and which may extend only part way through the layers 202-208 of the stack 200. In some embodiments, the method may comprise laser ablating the stack 200 to form a plurality of grooves 212 (not shown in FIG. 4 but see e.g. FIGS. 8 and 9). The plurality of grooves 212 may be formed to partially segment the stack 200 into partial cells, but without (at this stage) completely separating those individual cells. This may allow for improved further processing and handling of the stack 200 which may improve efficiency.

As illustrated in FIG. 4, the groove 212 has a depth that extends into the stack 200 in a direction substantially perpendicular to the plane of the layers 202-208. That is, a depth that extends in a direction parallel to the z axis as illustrated in FIG. 4. The groove 212 has a width substantially perpendicular to the depth (the width and depth of the groove 212 are in the plane of the page in the sense of FIG. 4). That is, the groove has a width that extends in a direction parallel to the x axis as illustrated in FIG. 4. The groove 212 has a length that extends in a direction substantially parallel to the plane of the layers 202-208 and substantially perpendicular to the width (i.e. into, and/or out of, the plane of the page in the sense of FIG. 4). That is, the groove 212 has a length that extends in a direction parallel with the y axis as illustrated in FIG. 4. In some embodiments where there a plurality of such grooves 212 formed in the stack 200, each of the grooves may be formed substantially parallel to one another in both the depth and length directions.

It should be noted that FIG. 4 (similarly to the other Figures) is a schematic diagram for illustrative purposes only. For example, the dimensions and relative spacings of the features illustrated in FIG. 4 (e.g. the layers 202-208, the groove 212 etc.) are schematic only and merely serve to illustrate example structures and processes described herein.

As illustrated in FIG. 4, the groove 212 is formed in a first side 200a of the stack. In some example, the method may comprise laser ablating the stack 200 to form one or more second grooves (not shown in FIG. 4 but see e.g. FIG. 8) from a second side 200b of the stack 200, opposite to the first side 200a of the stack 200. In these embodiments, the further grooves (not shown) may each be formed through the substrate layer 202, the cathode layer 204 and the electrolyte layer 206, but not through the anode layer 208, for example. As will be described in more detail with reference to FIGS. 8 to 12, cutting the stack 200 to form grooves in this way may provide for efficient further processing of the stack.

As illustrated in FIG. 4, laser ablating the stack 200, to form the cut or groove 212 through one or more of the layers 202-208, produces one or more laser ablation products 210. The laser ablation may be performed under vacuum conditions and/or in the presence of an inert gas. As illustrated in FIG. 4, the laser ablation forms a cloud or plume 210 of laser ablation products. As described, laser ablation of the stack 200 may cause removal of material 200 from the stack by one or a combination of physical processes. The laser ablation products 210 may comprise the material, for example particles of the material, removed from the stack 200 by the laser ablation. For example, the material of the stack 200 may be may be evaporated, vaporised, sublimated and/or mechanically or thermo-mechanically shocked from the stack 200 to form the cloud or plume of laser ablation products 210.

In some embodiments, the laser ablation products 210 may comprise species or particles derived from the material of the stack 200. For example, in cases where the laser ablation causes decomposition of the material of the stack 210, laser ablation products 210 may comprise component particles or species of the material of the stack 200. As another example, in embodiments where the laser ablation causes ionisation of the material of the stack 200, the laser ablation products 210 may comprise ionised particles or species of the material of the stack 200 (or derivatives thereof). As another example, in examples where the laser ablation causes or induces reaction of a material of the stack with one or more species, the laser ablation products 210 may comprise the products of such a reaction, or indeed particles or species derived from such reaction products.

In any case, it will be appreciated that the laser ablation products 210 produced by the laser ablation may characterise the stack 200 or one or more layers 202-208 thereof. For example, the laser ablation products 210 produced at any given time may be relatable to the material of the layer 202-208 of the stack 200 that is being laser ablated at that given time. For example, the laser ablation products 210 may identify the layer 202-208 of the stack that is being ablated at that given time. The laser ablation products 210 may characterise a quality of the layer 202-208 of the stack 200 being laser ablated. For example, the laser ablation products 210 may characterise or otherwise indicate a relative proportion of constituents of the layer 202-208, for example whether a correct or intended relative proportion of constituents of the layer 202-208 are indeed present. As another example, the laser ablation products 210 may characterise or otherwise indicate whether any impurities are present in the layer 202-208.

As illustrated in FIG. 4, the laser ablation products 210 are analysed by an analyser 220 to determine one or more characteristics of the stack 200.

In some embodiments, the determined characteristic may comprise, for example, an identity of one or more of the laser ablation products 210. For example, mass spectrometry may be performed on the laser ablation products 210 to determine mass of the constituent particles or species thereof. These masses may be mapped onto an identity of the laser ablation products 210. The determined characteristic may comprise an identity of one or more components of one or more of the layers of the stack 200. For example, the determined identity of the laser ablation products 210 may be mapped onto known components of the stack 200.

In some embodiments, the determined characteristic may comprise a quality control parameter for the stack 200 or one or more layers 202-208 thereof. For example, the quality control parameter may indicate a proportion of components in the stack, and/or the presence and/or severity of any defects for example impurities present in the stack. The determined quality control parameter may be compared to quality control standards to determine whether or not the stack 200 meets these standards. As another example, the quality control parameter may itself indicate whether, or the extent to which, the stack 200 meets pre-defined quality control standards. For example, the determined identity of the components of the stack 200 or one or more layers 202-208 thereof, may be used to, for example, check whether the components are present in an expected or a correct proportion, and/or whether any of the identified components represent undesired impurities in the stack 200 (for example a component that is not expected to be or should not be in the stack 200).

In some embodiments, the determined characteristic may be stored by the analyser 220 in a computer readable storage means 222, such as a computer memory 222. As described in more detail with reference to FIGS. 6 and 7, determining a characteristic of the stack 200 may inform upstream production and/or downstream processing of the stack 200, and hence may allow for improvement of the efficiency and/or reliability of production and/or processing of the stack 200.

The laser ablation products 210 may be those resulting from the laser ablation to form the groove(s) 212 in the stack 200. As described in more detail with reference to FIGS. 8 to 12, the formation of the groove(s) 212 may be performed as part of the processing of the stack 200 to produce an energy storage device. Therefore, the laser ablation products 210 analysed being those produced by the formation of the groove(s) 212 may allow for an efficient determination of a characteristic of the stack 200, for example as compared to providing separate means for laser ablating the stack to form the groove(s) 212 and for laser ablating the stack to produce the laser ablation products 210 to be analysed.

The analyser 220 may comprise a mass spectrometer 219. That is, the laser ablation products 210 may be analysed using a mass-spectrometry based technique to determine one or more characteristics of the stack 200. In this example, the analyser 220 comprises a collection element 214, in this example a sampling tube 214, arranged to collect a sample of the cloud of ablation products 210 and transport the sample to the mass spectrometer 219 for analysis.

The mass spectrometry-based technique may comprise, without limitation, any one of Secondary Ion Mass Spectrometry (SIMS), Time Of Flight Mass Spectrometry (TOF-MS), and Inductively Coupled Plasma Mass Spectrometry (ICP-MS). That is, the mass spectrometer 219 may be, without limitation, any one of a Secondary Ion Mass Spectrometer, a Time Of Flight Mass Spectrometer, and an Inductively Coupled Plasma Mass Spectrometer. For example, in SIMS, a primary ion beam may be directed at the laser ablation products 210 and secondary ions ejected therefrom may be collected and their mass analysed. As another example, in TOF-MS, the laser ablation products 210 may be ionised (or may themselves already be ionised as a result of the laser ablation) and the mass-to-charge ratio of these ions may be determined using a time-of-flight measurement. As another example, in ICP-MS, the laser ablation products 210 may be ionised using an inductively coupled plasma and the mass-to-charge ratio of these ions determined. It will be appreciated that in some examples any mass-spectrometry based technique may be used.

Analysing the laser ablation products 210 using a mass spectrometry-based technique may provide for a relatively fast, for example real-time or near real-time, analysis of the laser ablation products 210. For example, these mass spectrometry-based techniques may allow for relatively fast analysis as compared to spectroscopic based techniques. Of the mass spectrometry based techniques, Inductively Coupled Plasma Mass Spectrometry (ICP-MS) may provide for a particularly rapid analysis of the laser ablation products 210. The mass-spectrometry based technique being relatively fast may allow, for example, the determination of the characteristic of the stack 200 based on the analysis of the laser ablation products 210 to be performed relatively quickly. This may allow for the analyser 220 to accurately characterise the stack 200, for example different portions of the stack 200, even when the cuts or grooves 212 of the stack are formed relatively quickly. For example, the cuts or groove(s) 112 may be formed as part of a reel-to-reel type production process as described with reference to FIG. 2. Formation of the cuts or grooves 210 relatively quickly may provide an efficient cell production process. As described with reference to FIG. 6, relatively fast analysis of the laser ablation products may allow for a substantially real time or near real time adjustment of the stack production process based on the determined characteristics of the stack, which may allow for efficient production of the stack.

In some embodiments, the analysis of the laser ablation products 210 may not use a mass-spectrometry based technique, i.e. the analyser 220 need not necessarily comprise a mass spectrometer 219, and in these embodiments other analysis techniques may be used. For example, the laser ablation products 210 may be analysed using a spectroscopic technique. For example, the laser ablation products 210 may be analysed using X-ray Photoelectron Spectroscopy (XPS), X-ray Fluorescence (XRF), or Laser Induced Breakdown Spectroscopy (LIBS). For example, in XPS, the laser ablation products 210 may be irradiated with a beam of X-rays while simultaneously measuring the kinetic energy and number of electrons that escape from the products. For example, in XRF, the laser ablation products 210 may be excited by a primary X-ray source and the fluorescent (or secondary) X-ray emitted from laser ablation products 210 may be analysed. For example, in LIBS the laser ablation beam 216 may atomise and excite the material of the stack 200 thereby forming the laser ablation products 210, or a different laser (not shown) may atomise and excite the laser ablation products 210, and the light emitted from the excited atoms may be analysed to identify the atoms thereof.

In some embodiments, the method may comprise correlating a position of the laser ablation with the determined one or more characteristics.

In some embodiments, the position of the laser ablation may comprise a depth of the laser ablation into the stack 200. That is, the position may comprise a position along an axis parallel to the z axis in the sense of FIG. 4. For example, the laser ablation may be applied to the first side 200a of the stack 200, and the laser ablation may form the cut or groove 212 successively through the anode layer 208, the electrolyte layer 206, and the cathode layer 202.

The depth of the laser ablation 200 into the stack 200 may be determined, for example, from a duration of laser ablation and/or a number of pulses of laser ablation applied to the stack 200 at a given position. For example, it may be known in advance that each pulse of laser ablation produces a cut 212 having a depth of, say, 1 micrometre, and hence it may be determined that after, say, five pulses, the laser ablation is occurring at a depth of 5 micrometres into the stack 200. The characteristic determined from analysing the laser ablation products 210 produced from each pulse of laser ablation may therefore be correlated with the corresponding depth into the stack 200 of the laser ablation provided by that pulse.

In some embodiments, the depth of laser ablation correlated with the determined characteristic of the stack 200 may be used to determine whether each layer 204-208 of the stack 200 is of the correct or expected thickness. For example, the determined characteristic may comprise an identity of the laser ablation products. It may be known in advance that a first layer (e.g. anode layer 208) produces laser ablation products of a first identity, and that a second layer (e.g. electrolyte layer 206) produces laser ablation products of a second identity. It may be desired that the first layer (e.g. anode layer 208) is, say, 5 micrometres thick. Therefore, for example, if it is determined that laser products of the second identity are being produced at a laser ablation depth of only 3 micrometres into the stack 200, then it may be determined that the first layer (e.g. anode layer 208) is too thin, and for example that quality control standards have not been met. As described with reference to FIG. 6, this information may be used to adjust the stack production process accordingly, i.e. adjusted so that the production process produces a stack 200 that does meet quality control standards.

In some embodiments, the depth of the laser ablation correlated with the determined characteristic of the stack may be used to determine a composition in different layers 202-208 of the stack 200. For example, it may be known (or assumed) that each of the anode layer 208 and the electrolyte layer 206 is, say, 5 micrometres thick, and that each laser ablation pulse cuts a depth of, say, 1 micrometre. In this case, the laser ablation products 210 from a first set of five pulses of laser ablation may be used to determine the composition of the anode layer 202, and the laser ablation products 210 from a second set of five pulses of laser ablation may be used to determine the composition of the electrolyte layer 206 (and so on). As described, the determined composition may be compared to an expected or desired composition so as to determine whether or not each layer 202-208 of the stack meets quality control standards. As described with reference to FIG. 6, this information may be used to adjust the stack production process accordingly, i.e. adjusted so that the production process produces a stack 200 that does meet quality control standards.

In some embodiments, the position of the laser ablation may comprise at least one location in the plane of the stack 200. That is, the position may comprise a location in the plane of any one of the layers 202-208 of the stack. That is, the position may comprise a location in a plane parallel to the plane defined by the x and y axes in the sense of FIG. 4. For example, the position may comprise a location along an axis parallel to the x axis in the sense of FIG. 4. Alternatively, or additionally, the position may comprise a location along an axis parallel to the y axis in the sense of FIG. 4. In embodiments where the position comprises both a location along an axis parallel to the x axis and a location along an axis parallel to the y axis, the position may comprise a coordinate in the x-y plane.

Correlating the determined characteristic with a location, of the laser ablation, in the plane of the stack 200 may provide for granular characterisation, e.g. quality control information, of the stack to be provided for. For example, as mentioned, the determined characteristic may comprise a quality control parameter indicating, for example, whether the components of the stack 200 are as expected or desired. Correlating this information with the location in the plane of the stack 200 (e.g. as opposed to just the depth perpendicular to the plane of the stack 200) to which the information corresponds may provide for a determination of specific regions of the stack which do comply with quality control standards and specific regions of the stack which do not comply with quality control standards. As described in more detail with reference to FIGS. 6 and 7, this may provide for improved control of the upstream production and/or downstream processing of the stack, and hence for more efficient and/or reliable production of an energy storage cell.

In some embodiments, the position of the laser ablation in the plane of the stack 200 may be determined based on a position of the laser system 218 relative to the stack 200. For example, in some embodiments, the laser system 218 (or a component thereof) may be controlled to direct the laser ablation beam 216 to different positions in the plane of the stack 200. For example, the laser system 218 (or a component thereof) may be controlled to move in a plane parallel to the plane of the stack 200. The location of the laser ablation in the plane of the stack 200 may be determined based on the position at which the laser system 218 (or a component thereof) is located in a plane parallel to the plane of the stack 200. For example, this may be determined based on the location at which laser system 218 (or a component thereof) is controlled to be located, and/or based on a sensor (not shown) arranged to sense the location of the laser system 218 (or a component thereof).

Figure 5:
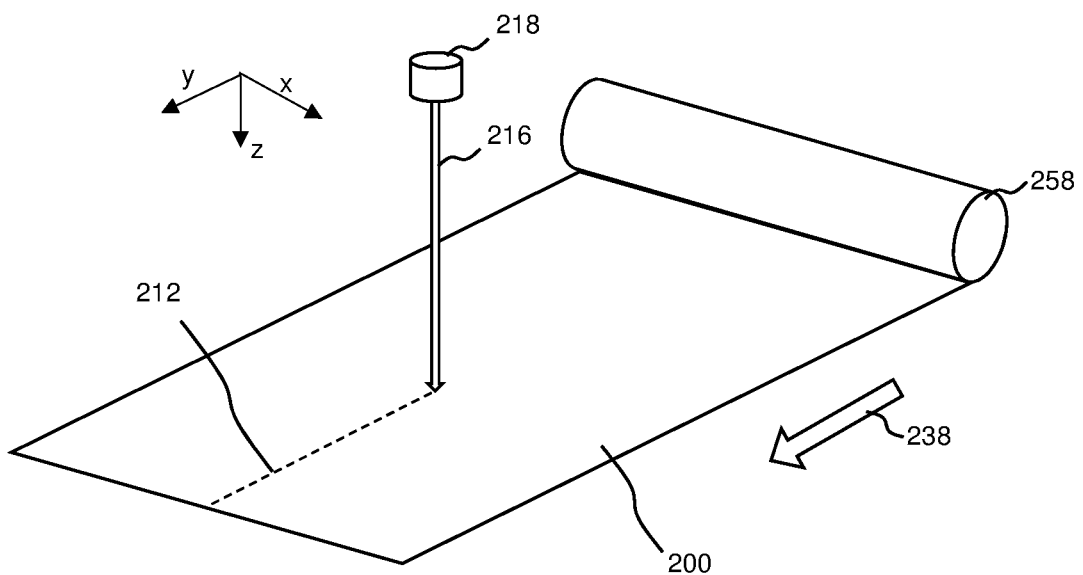
FIG. 5 is a schematic diagram that illustrates one way of analysing a stack according to a second example.

In some embodiments, the method may comprise moving, concurrently with or intermittently of the laser ablating, the stack in a first direction 238. For example, as illustrated in FIG. 5, the stack 200 may be wound out from a reel 258 so a substantially planar section travels in the first direction 238. As illustrated in FIG. 5, the first direction 238 is parallel to the y axis in the sense of FIGS. 4 and 5. Laser ablation, for example as described with respect to FIG. 4, is applied to the stack 200 as it travels in the first direction 238, thereby forming a groove 212 in the stack. As illustrated in FIG. 5, the groove 212 so formed extends (i.e. is elongate) in a direction parallel to the first direction 238. The laser ablation is provided by a laser beam 216 provided from the laser system 218. In some embodiments, the laser system 218 may be provided on a fixed rig (not shown) and the stack may move in the first direction 238 relative to the fixed rig (not shown). In some embodiments, the stack 200 may be moved in the first direction 238 in a reel-to-reel type process (for example as described with reference to FIG. 2), in which the stack 200 is wound out from the first reel 258 for laser ablation and wound onto a second reel (not shown) once the laser ablation has been performed. The first direction of travel 236 may be between the two reels.

In some embodiments, the position of the laser ablation may comprise a location along an axis parallel to the first direction 238 (e.g. a location along the y axis in the sense of FIG. 5).

The location of the laser ablating in a direction along an axis parallel to the first direction 238 may be determined, for example, by measuring a travel distance of the stack 200 in the first direction 238. For example, a trundle wheel (not shown, but see e.g. the roller 610 of FIG. 6) or other means for measuring the movement of the stack 200 in the first direction 238 may record the distance of travel of the stack 200 in the first direction 238 relative to the (fixed) laser system 218. As another example, a sensor may be arranged to sense rotation of the reel 258 and thereby infer a distance travelled by the stack 200. For example, a circumference or radius or diameter of the stack 200 on the reel 258 may be known in advance or may be measured, and may be used with the extent of the sensed rotation of the reel 258 in order to determine the distance travelled by the stack 200 (e.g. if the reel 258 is rotated by one revolution then the stack 200 will have travelled a distance equal to one circumference of the stack 200 on the reel 258, or $2x$ multiplied by the radius of the stack 200 on the reel 258). Each characteristic of the stack 200 determined by analysing the laser ablation products 210 may be correlated (e.g. associated with) the distance of travel recorded when the characteristic was determined (or with some predetermined offset between characteristic determination and travel distance recording). In this way, the determined characteristics may be correlated with the location along an axis parallel to the direction of travel 238 to which the characteristic corresponds.

As another example, the location of the laser ablating in a direction along an axis parallel to the first direction 238 may be determined, for example, based on a speed of travel of the stack 200 in the first direction 238. For example, the speed at which the stack 200 is wound out from the reel 258 may be measured or predetermined. The speed at which the stack 200 is wound out from the reel 258 may be constant or may have a predetermined profile with respect to time. The time at which each given laser ablation is performed producing laser ablation products 210 on the basis of which a given characteristic is determined may be recorded. This time may be relative to a start time at which the movement of the stack 200 in the first direction 238 begins. The speed at which the stack moves 238 in the first direction 238 may then be used to infer a given time, relative to the start time, at which a given location in a direction parallel to the direction of travel 238 of the stack 200 would have been subject to laser ablation. This given time may be compared to the recorded time for each characteristic, thereby to correlate the characteristic with the location in a direction parallel to the direction of travel 238 with which the characteristic is associated. Determining the location based on the speed of travel of the stack 200 may provide for the correlation of the characteristic with the location in a direction parallel to the direction of travel 238 of the stack 200 without the need for means to directly measure the travel of the stack 200, and hence may allow for cost effective analysis.

In some embodiments, the position of the laser ablation (correlated with the determined characteristic) may comprise a location along an axis perpendicular to the first direction 238 (e.g. a location along the x axis in the sense of FIG. 5).

The location of the laser ablating in a direction along an axis perpendicular to the first direction 238 may be determined, for example, based on a position at which the laser system 218 (or a component thereof) is located along an axis perpendicular to the first direction 238. For example, this may be determined based on the location at which laser system (or a component thereof) is controlled to be located, and/or based on a sensor (not shown) arranged to sense the location of the laser system (or a component thereof).

In some embodiments, there may be a plurality of laser ablation beams (not shown), for example spaced at regular intervals across the stack along an axis parallel to the x axis in the sense of FIG. 5. The plurality of laser ablation beams may be provided from a corresponding plurality of laser sources (not shown) spaced across the stack 200. As another example, there may be one laser source whose beam is split or otherwise manipulated to provide plural laser ablation beams. In these embodiments, the location of the laser ablating in a direction along an axis perpendicular to the first direction 238 may be determined, for example, based on a position at which a given one (or more) of the laser ablation beams is or is controlled to be located in along an axis perpendicular to the first direction 238. For example, the position of each of the plurality of laser ablation beams in a direction along an axis perpendicular to the first direction 238 may be known in advance. Each of the plurality of laser ablation beams may be controlled to be applied sequentially (e.g. one at a time). The characteristic determined from the analysis of the laser ablation products from laser ablation from a given one of the beams, may be correlated with the known position along the x axis of the given beam, thereby to allow the correlation of the determined characteristic with the location along an axis perpendicular to the first direction 238.

Correlating the determined characteristic with the location along an axis perpendicular to the first direction 238 may allow for variations in the properties, e.g. quality control characteristics, in the stack 200 in the direction perpendicular to the first direction to be determined and accounted for. As described in more detail with reference to FIGS. 6 and 7, this may provide for improved control of the upstream production and/or downstream processing of the stack, and hence for more efficient and/or reliable production of an energy storage cell.

It will be appreciated that the laser ablation and analysis of the laser ablation products thereof to determine a characteristic of the stack 200 at a correlated location of the laser ablation may be performed a plurality of times, for example substantially continuously, for different portions of the same stack 200. For example, in some embodiments, the method may comprise moving (e.g. in the first direction 238) the stack 200 relative to the laser beam 216 used for the laser ablating, laser ablating the stack 200 so as to form a further cut (not shown) through one or more of the layers of the stack 200, thereby producing one or more further laser ablation products (not shown), analysing (e.g. using the mass spectrometry based analysis technique) the further laser ablation products thereby to determine one or more further characteristics of the stack 200, and correlating a position of the further laser ablating with the determined one or more further characteristics.

In some embodiments, the method may comprise storing, in the storage medium 222, the correlated position and the determined one or more characteristics in association with one another. For example, the correlated position and the associated characteristics of the stack 200 determined for that position may be stored in association with each other in the form of a table or other data structure. In some embodiments, data representing the determined characteristic and data representing the associated correlated position may be stored in association with each other. This correlated information may be used to inform upstream production and/or downstream processing of the stack.

Figure 6:
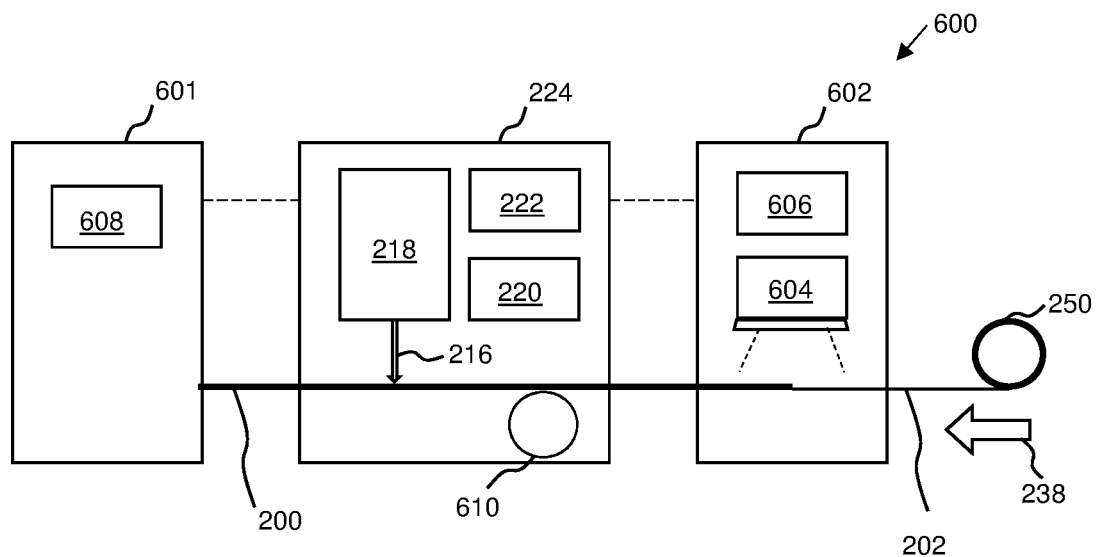
FIG. 6 is a schematic diagram that illustrates a system including an apparatus for analysing a stack according to an example.

Referring now to FIG. 6, there is illustrated a schematic diagram of a system 600 for the production and processing of the stack 200, according to an example. The system 600 comprises a deposition component 602, the apparatus 224 for laser ablating and analysing the stack 200, and a segmentation component 601.

The deposition component 602 is for depositing one or more of the cathode layer 204, electrolyte layer 206, and the anode layer 208 onto the substrate layer 202, thereby to produce the stack 200. The deposition component 602 comprises a controller 606 and a deposition element 604. The controller 606 is arranged to control deposition of material by the deposition element 604. The controller 606 may be arranged to control the deposition of material by the deposition element 604 based on one or more the characteristics of the stack 200 (and in some examples the correlated position) determined by the apparatus 224.

The apparatus 224 may be the same or similar to that described above with reference to FIG. 4. The apparatus 224 is for laser ablating the stack 200 and determining one or more characteristics of the stack 200 (and in some examples correlating the determined characteristics with a position of the associated laser ablation). The apparatus 224 comprises a laser system 218 arranged to laser ablate the stack 200 in use so as to form a cut through one or more of the layers of the stack 200, thereby producing one or more laser ablation products in use. The apparatus 224 comprises an analyser 220 arranged to analyse the laser ablation products produced in use thereby to determine the one or more characteristics of the stack 200. The apparatus 224 may comprise a correlator (not shown, but which may be provided by a suitable processing system, for example comprising a processor and a memory) arranged to correlate a position of the laser ablation with the determined one or more characteristics. For example, the position may comprise at least one location in the plane of the stack 200 ablated by the laser system 218 in use. For example, the position may comprise at least one location in a plane substantially perpendicular to an axis defined by the laser beam 216, produced by the laser system 218, that laser ablates the stack 200 in usc.

In some embodiments, the analyser 220 may comprise a mass spectrometer, and may be arranged to analyse, using a mass-spectrometry based technique, the laser products produced in use thereby to determine the one or come characteristics of the stack 200. In some embodiments, in use, concurrently with or intermittently of the laser ablation, the stack may be moved in the first direction of travel 238, and the correlator may be arranged to correlate the position of the laser ablation with the determined one or more characteristics based on a speed at which the stack 200 is moved, for example as described with reference to FIG. 5. The apparatus 224 comprises a storage or memory 222 arranged to store determined characteristics of the stack 200 e.g. along with the position with which each determined characteristic is associated. The apparatus 224 comprises a roller 610 that may be used for example to determine the location of a given laser ablation of the stack in a direction parallel to the first direction 238, for example as described with reference to FIGS. 4 and 5.

The segmentation component 601 is for segmenting the stack 200 into cells. The segmentation component 601comprises a controller 608 arranged to control further processing of the stack 200. For example, the further processing of the stack 200 may be the same or similar to that described with reference to FIGS. 8 to 12 hereinafter. For example, the segmentation component 602 may cut the stack into ribbons (see e.g. the ribbon 260 of FIG. 9), and/or fold the stack 200 into a z-fold type arrangement (see e.g. the folded stack 262 of FIG. 10), and/or segment the (folded) stack 200 into energy storage devices (see e.g. energy storage device 270*b* of FIG. 12).

Referring to FIG. 6, a sheet or web of substrate 202 is wound from a reel 250 in the first direction 238 and passes to the deposition component 602. The deposition element 604 of the deposition component 602 deposits the cathode layer 204, the electrolyte layer 206, and the anode layer 208 onto the substrate 202, thereby forming the stack 200. The deposition of the layers may be the same or similar to that described with reference to FIGS. 1 and 2. The stack 200 then passes to the apparatus 224, which may apply the method described with reference to FIGS. 3 to 5, that is, laser ablate the stack 200 to form a cut; analyse the laser ablation products thereof; and determine, based on the analysis, one or more characteristics of the stack 200 (which may be correlated with a location at which the laser ablation occurred). The determined characteristics (and correlated locations) may be stored in the storage means 222. The laser ablated stack 200 is then passed to the segmentation component 601, which may then segment the stack 200 into energy storage devices, for example as described with reference to FIGS. 8 to 12.

In the example of FIG. 6, the stack 200 is fed from the deposition component 602 to the apparatus 224, and the deposition by the deposition component 602 occurs before the laser ablation and analysis of the laser ablation products by the apparatus 224. In either one or both of these respects, the deposition and/or the deposition component 602 may be said to be up-stream of the laser ablating and analysis and/or the apparatus 224. Conversely, the stack 200 is fed from the apparatus 224 to the segmentation component 601, and the segmentation by the segmentation component 224 occurs after the laser ablation and analysis of the laser ablation products by the apparatus 224. In either one or both of these respects, the segmentation and/or the segmentation component 601 may be said to be down-stream of the laser ablating and analysis and/or the apparatus 224.

The determined one or more characteristics, and/or the correlated position and determined one or more characteristics described above with reference to FIGS. 4 and 5 may be used in the control of the upstream production of the stack 200 by the deposition component 602 and/or used in the control of the downstream segmentation of the stack 200 by the segmentation component 601, to provide efficient and/or reliable energy storage cell production.

For example, in some embodiments, the method may comprise using the determined one or more characteristics, or the correlated position and determined one or more characteristics, to adjust a production of the obtained stack 200.

For example, as the stack 200 is fed through the apparatus 224 in the first direction 224, the apparatus 224 may determine a characteristic, e.g. a quality control parameter, of the stack 200. For example, the quality control parameter may relate to the determined thickness and/or composition of, say, the anode layer 208 of the stack 200. The characteristic may be transmitted or otherwise provided to the controller 606 of the deposition component 602. The deposition component 602 may control deposition on the basis of the characteristic. This may occur substantially in real time or near real time.

The quality control parameter may be transmitted or otherwise provided to the controller 606 of the deposition component 602 so that the controller 606 may control the deposition of, say, the anode layer 208 by the deposition element 604 on the basis of the quality control parameter. For example, the quality control parameter may indicate that the determined thickness of the anode layer 208 deviates from an expected or desired thickness of the anode layer 208, and the controller 606 may control the deposition element 604 to adjust a thickness of the deposition of the anode layer 208 accordingly. For example, the determined thickness may be correlated with a location along the stack in a direction perpendicular to the first direction 238. In this case, the characteristic and the correlated position may indicate that the anode layer is thicker towards one side of the stack than the other. The controller 606 may therefore control the deposition element 604 to adjust the deposition distribution along a direction perpendicular to the first direction 238 accordingly. As another example, the quality control parameter may indicate that the determined composition of the anode layer is deviates from an expected composition, and the controller 606 may control the deposition element 604 to adjust the composition of the deposited anode layer 208 accordingly. Controlling the upstream production of the stack 200 based on the determined characteristics, or the correlated position and determined one or more characteristics, of the stack 200 may reduce the production of a stack 200 which does not meet quality control standards, and hence may improve the efficiency of energy storage cell production.

Controlling the upstream production of the stack 200 based on the determined characteristics, or the correlated position and determined one or more characteristics, of the stack 200 may be advantageous as compared to systems in which samples are taken from a batch and then analysed post-process. In these cases, if flaws are found in the samples, then the whole product may require either scrapping or investigation. However, the rapid analysis of the laser ablation products, and subsequent control of the deposition process based on the characteristics of the stack 200 derived from the analysis as described herein, may allow for quality control to be implemented during (continuous) production of the stack 200, and without needing a separate quality control step being performed on the stack 200, which may allow for more efficient processing.

In some embodiments, the method may comprise processing the stack 200, subsequent to the laser ablating and analysis of the laser ablation products thereof, based on the correlated position and determined one or more characteristics of the stack 200. For example, the correlated position and determined one or more characteristics of the stack 200 may be transmitted or otherwise communicated or provided to the segmentation component 601. The controller 608 of the segmentation component 601 may control the segmentation of the stack 200 into cells influenced by or based on the provided correlated position and determined one or more characteristics of the stack 200.

For example, the correlated position and determined one or more characteristics of the stack 200 may indicate that a certain portion of the stack 200 falls below quality control standards and hence for example that this certain portion should not be included into an energy storage device to be produced by the segmentation component 601.

As another example, the certain portion of the stack 200 may be included in the energy storage device produced by the segmentation component 601, but it may be determined that this certain portion will not produce effective cell(s), and hence that the segmentation of the stack 200 is to be performed so as to compensate for the presence of the ineffective cell(s). For example, as described with reference to FIGS. 9 to 12, the stack 200 may be folded and segmented to produce an energy storage device comprising dozens, possibly hundreds or possibly thousands of cells. For example, it may be desired that each energy storage device produced by the segmentation component 601 is to be made up of, say, 500 effective cells. It may be determined from the correlated position and determined one or more characteristics of the stack 200 that a given portion of the stack 200 (that will be included in a given energy storage device) will result in, say, two cells that will be ineffective. The segmentation component 601 may use this information to adjust the segmentation of the stack 200 so that the resultant energy storage device has 502 cells. That is, the energy storage device comprises 500 effective cells and the two cells determined as ineffective. Processing the stack 200 based on the correlated position and determined one or more characteristics of the stack 200 may therefore allow for reliable energy storage device production, which may, in turn, increase the efficiency of the energy storage device production. Further, this may reduce or obviate the need to apply a separate quality control procedure to the energy storage devices produced, as the energy storage devices have been produced in a way that already compensates for defects that may be present in the constituent stack 200. This may improve the efficiency of the cell production process.

In some embodiments, the method may comprise determining a parameter, based on the correlated position and determined one or more characteristics, for processing the laser ablated stack 200. For example, the parameter may comprise a number of energy storage device cells formed from the laser ablated stack 200 that are to be included in a given energy storage device. For example, as per the previous example, the apparatus 224 or the segmentation component 601 may determine, based on the correlated position and determined one or more characteristics, that a given portion of the stack 200 will produce two cells that are ineffective, and hence that 502 cells are to be included in the energy storage device including the given portion of stack 200, so as to compensate for the ineffectiveness of those two cells. The parameter may be stored in the storage means 222 of the apparatus 224 and/or transmitted or otherwise provided to the segmentation component 601, which may store the parameter in its own storage means (not shown). The segmentation may therefore be performed on the basis of a simple parameter, which may reduce the processing required at the segmentation component 601, and hence allow for an efficient segmentation process which provides reliable energy storage devices.

Figure 7:
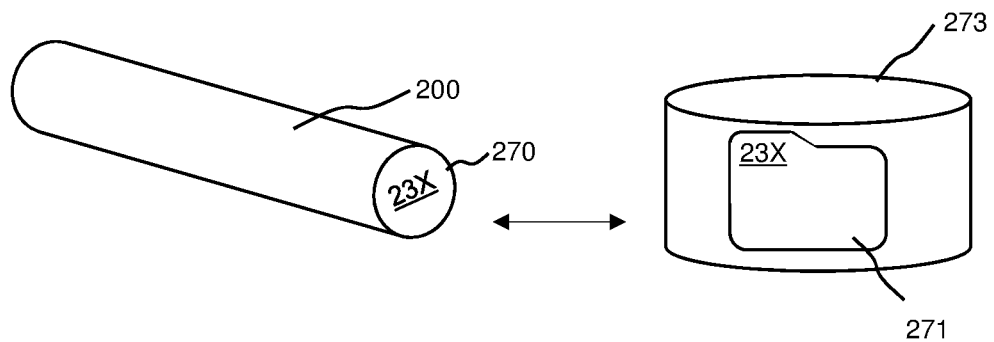
FIG. 7 is a schematic diagram that illustrates a stack and stored characteristics of the stack according to an example.

As illustrated schematically in FIG. 6, the stack 200 (having had the laser ablation applied thereto) may pass directly from the apparatus 224 to the segmentation component 601. However, in other embodiments, the laser ablated stack 200 may be instead wound onto another reel for segmentation processing at a different time and/or location. For example, as illustrated in FIG. 7, the laser ablated stack 200 may be wound onto a reel 270. The reel may have an identifier e.g. "23X" which may associate the stack 200 on the reel 270 with a data file 271 including the correlated position and determined one or more characteristics (or determined parameter) associated with the stack 200. The data file 271 may be stored in a storage medium 273 which may accompany the stack 200 on the reel 270. As another example, the data file 271 may be stored in a central storage (not shown) and the identifier may associate the reel 270 with the data file 273 in the central storage, which may then be accessed accordingly. As another example, the stack 200 on the reel 270 may be provided with a tag or code or other machine readable means, for example a radio frequency identification (RFID) tag, that itself carries the data file 271. In each of these embodiments, or otherwise the data file 273 may be provided to the segmentation component 601 when further processing of the stack 200 from the reel 270 is to take place. For example, the stack 200 on the reel 270 may be loaded into the segmentation component 601, and the segmentation component 601 may read the data file 271 associated with the reel 270. The segmentation component 601 therefore know, from the data file 273, the determined characteristics for each part of the stack 200 on the reel 270. For example, as the segmentation component 601 winds the stack 200 out from the reel 270, the segmentation component 601 may read from the data file 271 the characteristics of the portion of the stack 200 associated with a distance of stack 200 that has been reeled out. The segmentation component 601 may therefore process the stack 200 into energy storage devices based on the correlated position and determined one or more characteristics (or determined parameter) accordingly, for example so that each energy storage device has the same number of effective cells, even if some ineffective cells are nonetheless present in the energy storage devices.

Determining the correlated position and determined one or more characteristics of the stack 200 therefore may not only allow for improvements in the upstream production of the stack 200, but also in the downstream further processing of the stack 200, which may provide for reliable and/or efficient energy storage device production.

Described hereinafter with reference to FIGS. 8 to 12 is further processing of the stack 200 to produce an energy storage device according to an example. The further processing may be that performed for example by the segmentation component 601 of FIG. 6. As described, the correlated position and determined one or more characteristics of the stack 200 (or determined parameter) may be used in the further processing to improve the efficiency and/or reliability of the production of the energy storage device.

In some embodiments, the further processing may comprise providing insulating or dielectric material 246 into one or more of the cuts or grooves formed by the laser ablation.

Figure 8:
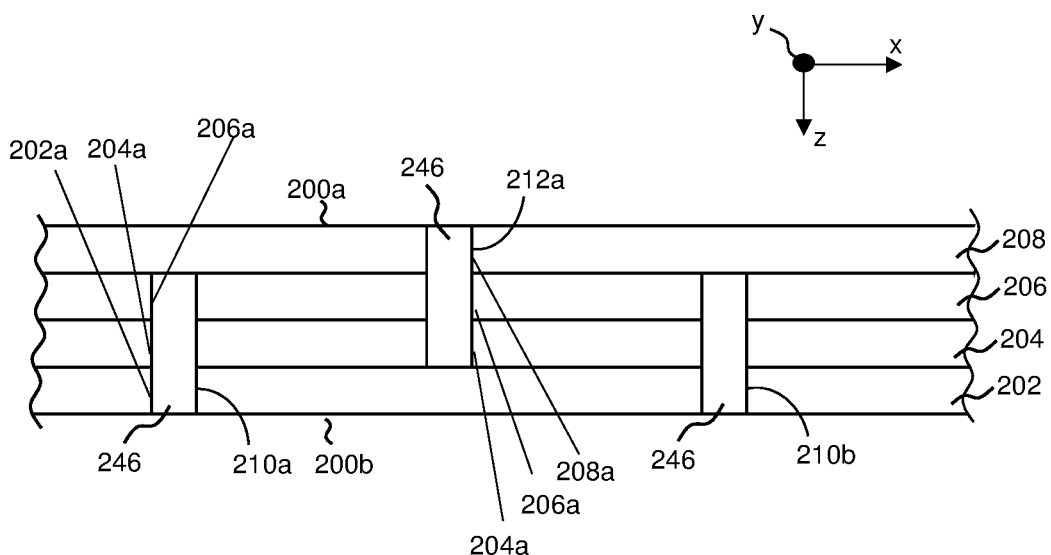
FIG. 8 is a schematic diagram of that illustrates a stack according to an example.

For example, referring to FIG. 8, there is illustrated schematically the stack 200 according to an example. Similarly to as illustrated in FIG. 4, the stack 200 illustrated in FIG. 8 is formed of a substrate layer 202, a cathode layer 204, an electrolyte layer 206, and an anode layer 208, all of which may be the same or similar to those described with reference to FIG. 4. The stack 200 of FIG. 8, again similarly to as in FIG. 4, has a cut or groove 212a formed in a first side 200a of the stack 200 through the anode layer 202, the electrolyte layer 206 and the cathode layer 204, but not through the substrate layer 202. The cut or groove 212a may be formed by laser ablation, and the laser ablation products 210 thereof analysed to determine one or more characteristics of the stack 200, as described with reference to FIGS. 3 to 6.

In the example of FIG. 8, there stack 200 has two further grooves 210a, 210b formed therein. Each of the further grooves 210a, 210b are formed in a second side 200b of the stack 200, through the substrate layer 202, the cathode layer 204, and the electrolyte layer 206, but not through the anode layer 208. Each of the further grooves 210a, 210b may be substantially the same as the groove 212a in the first side o200a of the stack, except that they are formed in the second side of the stack 200b (and consequently extend through different layers of the stack 200 as compared to the groove 212a). One of the further grooves 210a is located towards one side of the groove 212a in a direction perpendicular to the x axis, and the other of the further grooves 210b is located towards the other side of the groove 212 in a direction perpendicular to the x axis in the sense of FIG. 8. That is, the side 200a, 200b of the stack 200 in which each successive groove 210a, 212a, 210b is formed alternates. The further grooves 210a, 210b may be formed in substantially the same way as the groove 212a. For example, the further grooves 210a. 210b may each be formed by laser ablation, and the laser ablation products thereof may be analysed to determine one or more characteristics of the stack 200, for example correlated with a position at which the laser ablation was performed. It will be appreciated that although only three grooves 210a. 212b, 210b are illustrated in FIG. 8 there may be many such successively alternating grooves formed in the stack 200.

The laser ablating to form the grooves 210a. 212a, 210b exposes surfaces, for instance edges, of at least an electrode layer 204, 208 of the stack 200. Taking a first 210a of the grooves formed from the first side 200a of the stack 200 as an example, as illustrated in FIG. 8, the laser ablation forming the first 210a of the grooves exposes edges of the substrate layer 202a, edges 204b of the cathode layer 204, and edges 206a of the electrolyte layer 206. Similarly, for a second 212a of the grooves formed from the second side 200b of the stack, the laser ablation exposes edges 202a of the anode layer 208, edges 206a of the electrolyte layer 206, and edges 204a of the cathode layer 204.

An insulating material 246 may be provided in each of the grooves 210a, 212a, 210b. For example, the insulating material 246 may be deposited in each of the first grooves 210a, 212a, 210b, for example similarly as described with reference to FIG. 2. The insulating material 246 is therefore provided onto the exposed surfaces, such as edges 202a, 204a, 206a, 208a so as to provide an electrical insulation between the exposed edges 204a, 208a of the first electrode 202, 206 (i.e. one of the cathode layer 204 and the anode layer 208) and the exposed edges 204a, 208a of the second electrode 202, 206 (i.e. the other of the cathode layer 204 and the anode layer 208). This may avoid direct electrical contact and hence shorting of the charged anode layer 206 with the cathode layer 202 during laser ablation and/or in further processing of the stack 200. As described in more detail hereafter, providing the insulating material 246 in the grooves 210a, 212a, 210b may reduce the need to provide insulation on the folded stack edges at a later stage in the further processing of the stack 200, which may in turn allow for more efficient further processing of the stack 200.

In some embodiments, the further processing may comprise folding the stack 200. For example, in some embodiments, the further processing of the stack 200 may comprise cutting the stack 200 into one or more ribbons 254, 260 before folding the stack 200.

Figure 9:
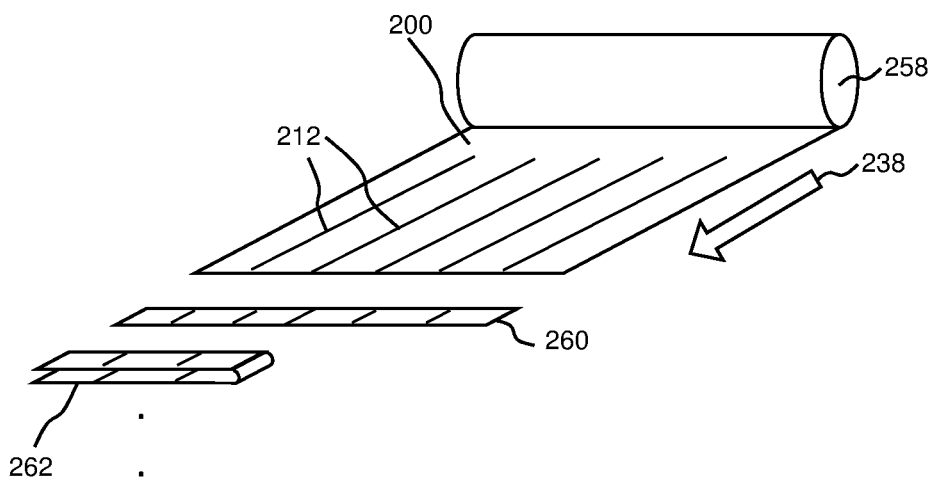
FIGS. 9 to 12 illustrate schematically exemplary further processing of the stack of FIG. 8.

For example, referring specifically now to FIG. 9, the stack 200 is provided from a reel 258 so as to travel in the first direction 238. The stack comprises a plurality of grooves 212 formed therein. The grooves 212 may be formed for example as described with reference to FIGS. 3 to 8. The plurality of first grooves 212 are elongate in a direction parallel to the first direction of travel 238. Forming the grooves 212 in this orientation may allow for the laser source(s) and/or ablation beams produced thereby to be provided from a static laser system relative to which the stack 200 may be moved, for example to form the grooves 218 in a substantially continuous process, which may be efficient.

As illustrated schematically in FIG. 9, the stack 200 (having the first grooves 212 formed therein) may be cut into a plurality of ribbons 260 (only one is shown in FIG. 9). For example, the ribbons 260 may be formed by laser cutting (not shown) the stack 200 along a direction perpendicular to the first travel direction 238. For example, the segmentation component 601 of FIG. 6 may comprise a laser cutter (not shown) arranged to cut the stack 200 into ribbons 260. Each ribbon 260 is elongate in a direction perpendicular to the extent of the first grooves 212. Each ribbon 260 may then be folded, for example at or towards a pre-marked registration feature or otherwise, for example in a folding process and/or by a folding machine) to create a folded stack 262. It will be appreciated that although only one fold is illustrated in FIG. 9, in other embodiments there may be many folds such that the folded stack 262 comprises many layers of the stack 200, for example dozens or hundreds of layers (see also FIG. 10).

Figure 10:
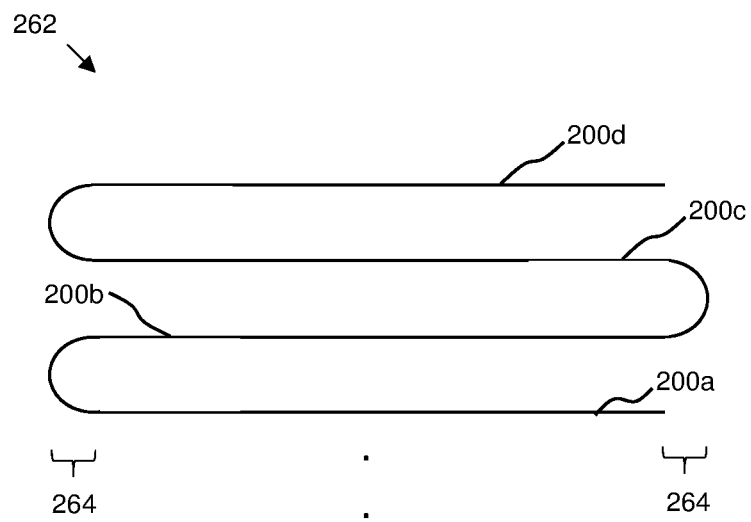

Referring now to FIG. 10, there is illustrated an example of a folded stack 262. The folded stack 262 may be produced by the folding process and/or folding machine as described, for example, with reference to FIG. 9. As illustrated in FIG. 10, the folded stack 262 has four stack layers 200a-200d (each stack layer comprising the stack 200 formed from the method described with reference to FIGS. 3 to 6). The stack is folded in a "z-fold" arrangement. In other words, the second stack layer 200b is folded back over the first stack layer 200a, such that the plane defined by the layers of the first stack layer 200a and the second stack layer 200b are substantially parallel with one another. Similarly, the third stack layer 200c is folded back over the second stack layer 200b, and the fourth stack layer 200d is folded back over the third stack layer 200c. The stack 200 may be folded so that each of the stack layers 200a-200d register or align with one another. For example, the stack 200 may be folded such that each stack layer 200a-200d is of the same length, so that the stack layers 200a-200d register or align with one another. The portions 264 of the stack layers 200a-200d at the folds (i.e. distal from a central portion of the folded stack 256) may be removed and/or regarded as waste material.

In some embodiments, the further processing may comprise segmentation of the folded stack 262 into energy storage devices 270a, 270b.

Figure 11:
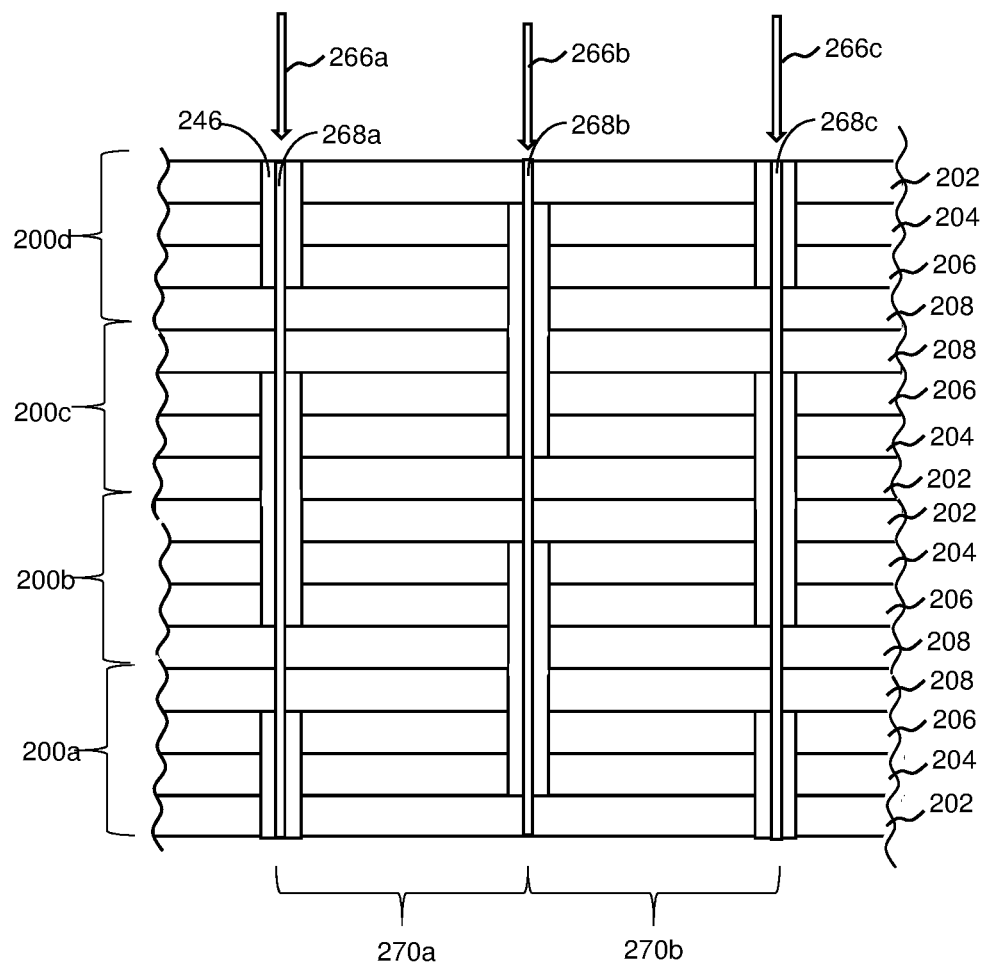

For example, referring to FIG. 11, there is illustrated a central portion of the folded stack 262 in more detail. As illustrated in FIG. 11, each of the stack layers 200a-200d are aligned with one another, i.e. such that the grooves (e.g. each being filled with insulating material 246) of one stack layer 200a are aligned (i.e. vertically aligned in the sense of FIG. 11) with the corresponding groves of an adjacent stack layer 200b. Each stack layer comprises the substrate layer 202, the cathode layer 204, the electrolyte layer 206 and the anode layer 202. It will be noted that, due to the folding of the second stack layer 200b back onto the first stack layer 200a, the second stack layer 200b is inverted as compared to the first stack layer 200a, and similarly the third stack layer 200c is inverted as compared to the second stack layer 200b, and similarly the fourth stack layer 200d is inverted as compared to the third stack layer 200c.

As illustrated schematically in FIG. 11, the further processing may comprise cell segmentation, that is, segmentation of the folded stack into cells of energy storage devices 270a, 270b. In this example the cell segmentation comprises laser ablation 266a-266c to form cuts 268a-268c through all of the first to fourth stack layers 200a-200d at each of the positions in which the grooves are aligned. It will be appreciated that in examples where the grooves are filled with insulating material 246, the cuts 268a-268c include cuts through the insulating material 246. The cuts 268a-268c segment the folded stack into energy storage devices 270a, 270b. The segmentation component 601 illustrated in FIG. 6 may comprise a cutting device, for example a laser cutting device, to form the cuts 268a-268c through the folded stack 200.

Figure 12:
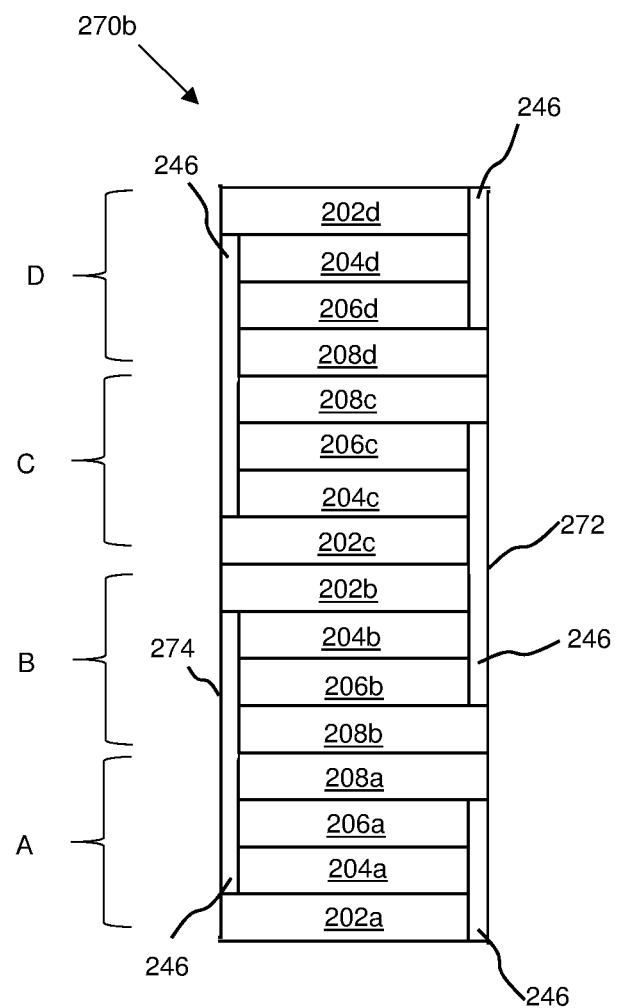

An example of a segmented energy storage device 270b is illustrated in FIG. 12.

The energy storage device 270b comprises in effect four cells A-D. The cell energy storage device 270b comprises the layers in the following order (from bottom to top in the sense of FIG. 12): in a cell A: first substrate layer 202a, first cathode layer 204a, first electrolyte layer 206a, first anode layer 208a; in a second cell B: second anode layer 208b, second electrolyte layer 206b, second cathode layer 204b, second substrate 202b; in a third cell C: third substrate 202c, third cathode layer 204c, third electrolyte layer 206c, third anode layer 208c, and in a further cell D: fourth anode layer 208d, fourth electrolyte layer 206d, fourth cathode layer 204d and fourth substrate 202d.

The formation of the grooves in the stack 200 and the insulating material 246 provided in the first grooves, the folding, and the segmentation as described provide that, for the segmented energy storage device 270b, only surfaces comprising the anode layers 208a-208d are exposed on a first side 272 of the device (the right hand side in the sense of FIG. 12) with all of the other layers being insulated on the first side 272 by the insulating material 246. Moreover, only surfaces comprising the substrate layers 202a-202d are exposed on a second, opposite, side 274 of the device 270b with all of the other layers being insulated on the second side 272 by the insulating material 246. As described, the substrate layers 202a-202d may comprise a conductive material, for example nickel.

The first side 272 of the device 270b may be coated with a first conductive material (not shown) so as to electrically connect all of the anode layers 208a-208d together, and the second side 274 of the device 270b may be coated with a second conductive material (not shown) so as to electrically connect all of the substrate layers 202a-202d (and hence all of the cathode layers 204a-204d) together. For example, a sputtered metallic layer may be applied on both sides 272, 274 of the device 270b. In this way, for example, the first conductive material may provide a contact for a first terminal of the energy storage device 270b (e.g. a positive terminal of the energy storage device 270b), and the second conductive material provides a contact for a second terminal of the energy storage device 270b (e.g. a negative terminal of the energy storage device 270b). In other words, in effect the four cells A-D of the energy storage device 270b are connected in parallel. The positive and negative terminals may be electrically connected across a load to power the load. Connecting the cells A-D in parallel may provide for the energy storage device 270b to provide for relatively high discharge rates, which may be useful in some applications.

As also described with reference to FIG. 6, the further processing of the stack 200 into the energy storage device 270b may be based on the determined characteristics and correlated positions of the stack 200. For example, the determined characteristics correlated with the portion of the stack 200 that forms, say, cell A of the energy storage device 270b illustrated in FIG. 12 may indicate that the portion falls below certain quality control standards and hence that cell A will not be effective (e.g. non-functional). Based on this information, the segmentation component 601 may determine that an extra cell (not shown) is to be included into the energy storage device 270b so as to compensate for cell A not being effective. The segmentation component 601 may therefore, for example, fold the stack 200 or stack ribbon 260 so that an extra stack layer 200*a*-200*d* is included into the folded stack 262. Therefore, it may be ensured that the resultant energy storage device 270*b* has four effective cells (even though the energy storage device 270*b* has one cell A that is not effective). In this way, the determined characteristics and correlated positions of the stack 200 (or parameters) may be used to provide that each energy storage device 270*b* produced may have the same effective capacity, irrespective of whether or not there are certain cells which may be ineffective.

Processing the stack 200 based on the correlated position and determined one or more characteristics of the stack 200 may therefore allow for reliable energy storage device production, which may, in turn, increase the efficiency of the energy storage device production. Further, this may reduce or obviate the need to apply a separate quality control procedure to the energy storage devices produced, as the energy storage devices have been produced in a way that already compensates for defects that may be present in the constituent stack 200. This may improve the efficiency of the cell production process.

Although in some of the foregoing embodiments the laser ablation products 210 analysed to determine the one or more characteristics of the stack 200 (in some embodiments correlated with the position of the laser ablating) are those produced by laser ablating the stack to form the cut(s) or groove(s) 212, 210*a*, 212*a*, 210*b*, it will be appreciated that this need not necessarily be the case and that in some embodiments the laser ablation products analysed may be products of laser ablation forming any cut through one or more layers of the stack 200. For example, alternatively or additionally, the laser ablation products analysed may be those produced from laser ablation to cut the stack into ribbons 260 as described with reference to FIG. 9 and/or the laser ablation products produced from laser ablation to segment the folded stack 260 into cells as described with reference to FIG. 11.

The above embodiments are to be understood as illustrative embodiments of the disclosure. It is to be understood that any feature described in relation to any one example may be used alone, or in combination with other features described, and may also be used in combination with one or more features of any other of the embodiments, or any combination of any other of the embodiments. Furthermore, equivalents and modifications not described above may also be employed without departing from the scope of the disclosure, which is defined in the accompanying claims.

The invention claimed is:

1. A method comprising:
obtaining a stack for an energy storage device, the stack comprising one or more layers;
laser ablating the stack so as to form a cut at least part way through one or more of the layers, thereby producing one or more laser ablation products;
analysing, using a mass spectrometry based analysis technique, the laser ablation products thereby to determine one or more characteristics of the stack;
correlating a position of the laser ablating with the determined one or more characteristics; and
determining a parameter, based on the correlated position and the determined one or more characteristics, wherein the parameter comprises a number of energy storage device cells formed from the laser ablated stack that are to be included in a given energy storage device.

2. The method of claim 1, wherein the position comprises at least one location in the plane of the stack.

3. The method of claim 1, wherein the method comprises moving, concurrently with or intermittently of the laser ablating, the stack in a first direction, and the position comprises a location along an axis parallel to the first direction.

4. The method of claim 1, wherein the method comprises moving, concurrently with or intermittently of the laser ablating, the stack in a first direction, and the position comprises a location along an axis perpendicular to the first direction.

5. The method of claim 1, wherein the position comprises a depth into stack.

6. The method of claim 1, wherein the method comprises storing, in a storage medium, data representing the correlated position and data representing the determined one or more characteristics in association with one another.

7. The method of claim 1, wherein the method comprises processing the laser ablated stack based on at least one of the correlated position and determined one or more characteristics or the determined parameter.

8. The method of claim 1, wherein the method comprises: moving the stack relative to a laser beam used for the laser ablating; laser ablating the stack so as to form a further cut through one or more of the layers, thereby producing one or more further laser ablation products; analysing, using the mass spectrometry based analysis technique, the further laser ablation products thereby to determine one or more further characteristics of the stack; and correlating a position of the further laser ablating with the determined one or more further characteristics.

9. The method of claim 1, wherein the method comprises using the determined one or more characteristics, or the correlated position and determined one or more characteristics, to adjust a production of the obtained stack.

10. The method of claim 1, wherein the determined one or more characteristics comprise one or more of: an identity of one or more of the laser ablation products, an identity of one or more components of one or more of the layers of the stack, and a quality control parameter for the stack.

11. The method of claim 1, wherein the mass spectrometry based technique comprises Inductively Coupled Plasma Mass Spectrometry, ICP-MS.

12. Apparatus for determining one or more characteristics of a stack for an energy storage device, the stack comprising one or more layers, the apparatus comprising:
a laser system arranged to laser ablate the stack in use so as to form a cut at least part way through one or more of the layers, thereby producing one or more laser ablation products in use;
an analyser arranged to analyse the laser ablation products produced in use thereby to determine one or more characteristics of the stack; and
a correlator arranged to correlate a position of the laser ablation with the determined one or more characteristics;
wherein the position comprises at least one location in the plane of the stack ablated by the laser system in use; and
wherein the apparatus is configured to determine a parameter, based on the correlated position and the determined one or more characteristics, wherein the parameter comprises a number of energy storage device cells formed from the laser ablated stack that are to be included in a given energy storage device.

13. The apparatus of claim 12, wherein the analyser is arranged to analyse, using a mass-spectrometry based technique, the laser products produced in use thereby to determine the one or more characteristics of the stack.

14. The apparatus of claim 13, wherein, in use, concurrently with or intermittently of the laser ablation, the stack moves in a direction of travel, and wherein the correlator is arranged to correlate the position of the laser ablation with the determined one or more characteristics based on a speed at which the stack is moved.

\* \* \* \* \*